US011905931B2

(12) United States Patent
Egedal et al.

(10) Patent No.: US 11,905,931 B2
(45) Date of Patent: Feb. 20, 2024

(54) CONTROLLER FOR A WIND TURBINE

(71) Applicant: Siemens Gamesa Renewable Energy A/S, Brande (DK)

(72) Inventors: Per Egedal, Herning (DK); Michael Stoettrup, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 199 days.

(21) Appl. No.: 17/601,203

(22) PCT Filed: Mar. 16, 2020

(86) PCT No.: PCT/EP2020/057059
§ 371 (c)(1),
(2) Date: Oct. 4, 2021

(87) PCT Pub. No.: WO2020/207704
PCT Pub. Date: Oct. 15, 2020

(65) Prior Publication Data
US 2022/0170442 A1 Jun. 2, 2022

(30) Foreign Application Priority Data
Apr. 9, 2019 (EP) .................................... 19168187

(51) Int. Cl.
*F03D 7/02* (2006.01)
*H02P 9/04* (2006.01)
*H02P 101/15* (2016.01)

(52) U.S. Cl.
CPC .......... *F03D 7/0272* (2013.01); *F03D 7/028* (2013.01); *F03D 7/0276* (2013.01); *H02P 9/04* (2013.01);
(Continued)

(58) Field of Classification Search
CPC ...... F03D 7/0272; F03D 7/0276; F03D 7/028; F05B 2220/706; F05B 2270/1033; H02P 9/04
See application file for complete search history.

(56) References Cited

U.S. PATENT DOCUMENTS 7,528,496 B2 * 5/2009 Fortmann ............... F03D 9/255
290/44
8,736,094 B2 * 5/2014 Wakasa ................... H02J 3/381
290/55
(Continued)

FOREIGN PATENT DOCUMENTS

CA    3 016 968 A1   10/2017
CA    3 039 580 A1    5/2018
(Continued)

OTHER PUBLICATIONS

International Search Report & Written Opinion dated Jun. 9, 2020 for PCT/EP2020/057059.

Primary Examiner — Pedro J Cuevas
(74) Attorney, Agent, or Firm — Schmeiser, Olsen & Watts LLP

(57) ABSTRACT

Provided is controller for a wind turbine including a power controller unit for controlling a power output of an electric generator included in the wind turbine. The power controller unit operates the electric generator according to a speed reference value and a power reference value, the speed reference value and a power reference value being chosen along a linear operating trajectory in a power vs speed graph, the linear operating trajectory including a point corresponding to the nominal power and the nominal generator speed. The power controller unit includes a slider command for selecting the angular position of the linear operating trajectory in the power vs speed graph.

12 Claims, 3 Drawing Sheets

(52) U.S. Cl.
CPC . *F05B 2220/706* (2013.01); *F05B 2270/1033* (2013.01); *H02P 2101/15* (2015.01)

(56) References Cited

U.S. PATENT DOCUMENTS

| | | | | |
|---|---|---|---|---|
| 9,163,611 | B2* | 10/2015 | Santiago Benito | F03D 9/255 |
| 9,261,079 | B2* | 2/2016 | Knüppel | F03D 7/0284 |
| 10,063,161 | B2* | 8/2018 | Li | H02K 7/183 |
| 10,094,360 | B2* | 10/2018 | Arlaban Gabeiras | F03D 7/0276 |
| 10,294,922 | B2* | 5/2019 | Spruce | F03D 7/0292 |
| 10,683,843 | B2* | 6/2020 | Messing | F03D 7/0276 |
| 11,306,701 | B2* | 4/2022 | Neto | F03D 7/0276 |
| 11,499,524 | B2* | 11/2022 | Ramirez Sanchez | H02J 3/1885 |
| 11,585,322 | B1* | 2/2023 | Hossain | G05D 13/66 |
| 2007/0085343 | A1* | 4/2007 | Fortmann | F03D 7/0264 290/44 |
| 2012/0313593 | A1* | 12/2012 | Knuppel | F03D 7/0284 323/234 |
| 2013/0187385 | A1* | 7/2013 | Wakasa | H02J 3/381 290/44 |
| 2014/0246856 | A1* | 9/2014 | Santiago Benito | F03D 7/042 290/44 |
| 2016/0069323 | A1* | 3/2016 | Arlaban Gabeiras | F03D 7/0276 416/37 |
| 2017/0002796 | A1* | 1/2017 | Spruce | F03D 7/048 |
| 2018/0109201 | A1* | 4/2018 | Li | F03D 17/00 |
| 2019/0055924 | A1 | 2/2019 | Ansbjerg | |
| 2021/0172419 | A1* | 6/2021 | Neto | F03D 7/0276 |
| 2022/0263319 | A1* | 8/2022 | Ramirez Sanchez | H02J 3/381 |
| 2022/0325695 | A1* | 10/2022 | Serna Garcia-Conde | F03D 7/0224 |

FOREIGN PATENT DOCUMENTS

| | | | | |
|---|---|---|---|---|
| EP | 2 113 659 A2 | 11/2009 | | |
| WO | WO-2005025026 A1 * | 3/2005 | | F03D 7/0264 |
| WO | 2019/134793 A1 | 7/2019 | | |

* cited by examiner

CONTROLLER FOR A WIND TURBINE

CROSS-REFERENCE TO RELATED APPLICATIONS

This application claims priority to PCT Application No. PCT/EP2020/057059, having a filing date of Mar. 16, 2020, which claims priority to EP Application No. 19168187.3, having a filing date of Apr. 9, 2019, the entire contents both of which are hereby incorporated by reference.

FIELD OF TECHNOLOGY

The following relates to the field of controlling the operation of wind turbines.

BACKGROUND

A wind turbine controller has several aspects; it must maximize power production, reduce and limit structural and electrical loads, and also reduce and limit acoustic noise emissions. Typically, the wind turbine controller comprises multiple controllers that are used to achieve the control aspects by individually controlling actuators for yaw direction, generator power (or torque), and blade pitch angles.

When running on subsidies-based markets, wind turbines are running more or less on the highest possible power production. In the future wind turbines are going to be sold to non-subsidies-based markets, where alternative use of the turbines is expected to be relevant. The turbine can e.g., be operated at a curtailed level to be ready for a fast ramp-up of power in a balancing service configuration. Wind turbines could also be operated at curtailed level because the power production is higher than the submitted day-before offer. In this case there might not be a need for fast ramp rates. The capability to ramp up to maximum production is related to the rotor speed of the turbines. If fast ramp up rates are required the speed has to be kept at or near the optimal operating point, i.e., nominal speed, to avoid first accelerating the rotor before optimal power can be produced.

In the case there is not a need for fast ramp up rates, it would be beneficial to reduce the rotor speed to get some load reduction, as e.g., tower fatigue loads are much related to the rotor speed and not the power.

Accordingly, there is a need for an improved way of controlling a wind turbine, which may either operate at the highest possible power production or at a curtailed level.

SUMMARY

An aspect relates to a controller for a wind turbine, the controller comprising a power controller unit for controlling a power output of an electric generator comprised in the wind turbine, the power controller unit operating the electric generator according to a speed reference value and a power reference value, the speed reference value and a power reference value being chosen along an operating trajectory in a power vs speed graph, the operating trajectory including a point corresponding to the nominal power and the nominal generator speed, wherein the power controller unit includes a slider command for selecting the angular position of the operating trajectory in the power vs speed graph.

In the present context, the term "slider command" may be any command of the mechanical type (for example a button) or electrical type (for example a switch) or electronical (for example a programmable logic circuit or block), or a telegram/message via a communication network which may be used to change the angular position of the operating trajectory in the power vs speed graph. The slider is used to adjust how much the speed reference change as a function of the power curtailment.

According to a second aspect of embodiments of the invention there is provided a method of controlling operation in a wind turbine, the method comprising:
operating the electric generator according to a speed reference value and a power reference value, the speed reference value and a power reference value being chosen along an operating trajectory in a power vs speed graph, the operating trajectory including a point corresponding to the nominal power and the nominal generator speed, and
selecting the angular position of the operating trajectory in the power vs speed graph.

According to embodiments of the present invention, the operating trajectory may be linear and the slider is used to adjust the slope of the linear trajectory.

According to embodiments of the present invention, the linear operating trajectory is movable in the power vs speed graph between a vertical operating trajectory and an inclined operating trajectory, an angle being provided between the vertical operating trajectory and the inclined operating trajectory, the value of the angle being selectable through the slider command of the power controller unit between 0° and 90°.

When the linear operating trajectory is selected as a vertical operating trajectory, a power ramp-up rate is generated to be applied to the electric generator for reaching a nominal power of the electric generator at the nominal generator speed. When the linear operating trajectory is selected as an inclined operating trajectory, the resulting ramp up rate is lower as the rotor needs to be accelerated before while the power is ramping up. The operating point may be moved along the inclined operating trajectory to reach the nominal power of the electric generator at the nominal generator speed.

Embodiments of the present invention make it possible to select between a configuration which provides fast power ramp-up rates (vertical operating trajectory) or provides slower power ramp-up rate and load reduction at reduced generator speed (inclined operating trajectory).

The operating point may be moved through a plurality of inclined operating trajectory. According to one embodiment of the present invention the inclined operating trajectory is chosen in order to provide a constant torque measured on the electric generator. According to another embodiment of the present invention, the operating trajectory is chosen in order to provide a maximum power of the electric generator at each speed reference value.

Embodiments of the present invention provide an improved level of flexibility in controlling a wind turbine. If the turbine is curtailed and high ramp-up rates is not required, it is possible to get load reduction. The load reduction might be used to enable a power upgrade of the turbine, or extend the lifetime, or overpower the turbine at a later point.

The controller and the control method of embodiments of the present invention may be used in single wind turbines or at a wind park including a plurality of wind turbines. Fixed configurations depending on the operation mode of the wind park controller may be used. For example, balancing control or frequency support could have one configuration with fast ramp-up rates, while curtailment to avoid over production could have another configuration with slow ramp-up rates. The wind park functionality can also assign different tradeoffs/slide settings to different turbines and toggle the slider command settings between turbines periodically in order balance the load impact on turbines.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that the invention is not limited to the described exemplary embodiments.

BRIEF DESCRIPTION

Some of the embodiments will be described in detail, with references to the following Figures, wherein like designations denote like members, wherein.

DETAILED DESCRIPTION

Figure 1:
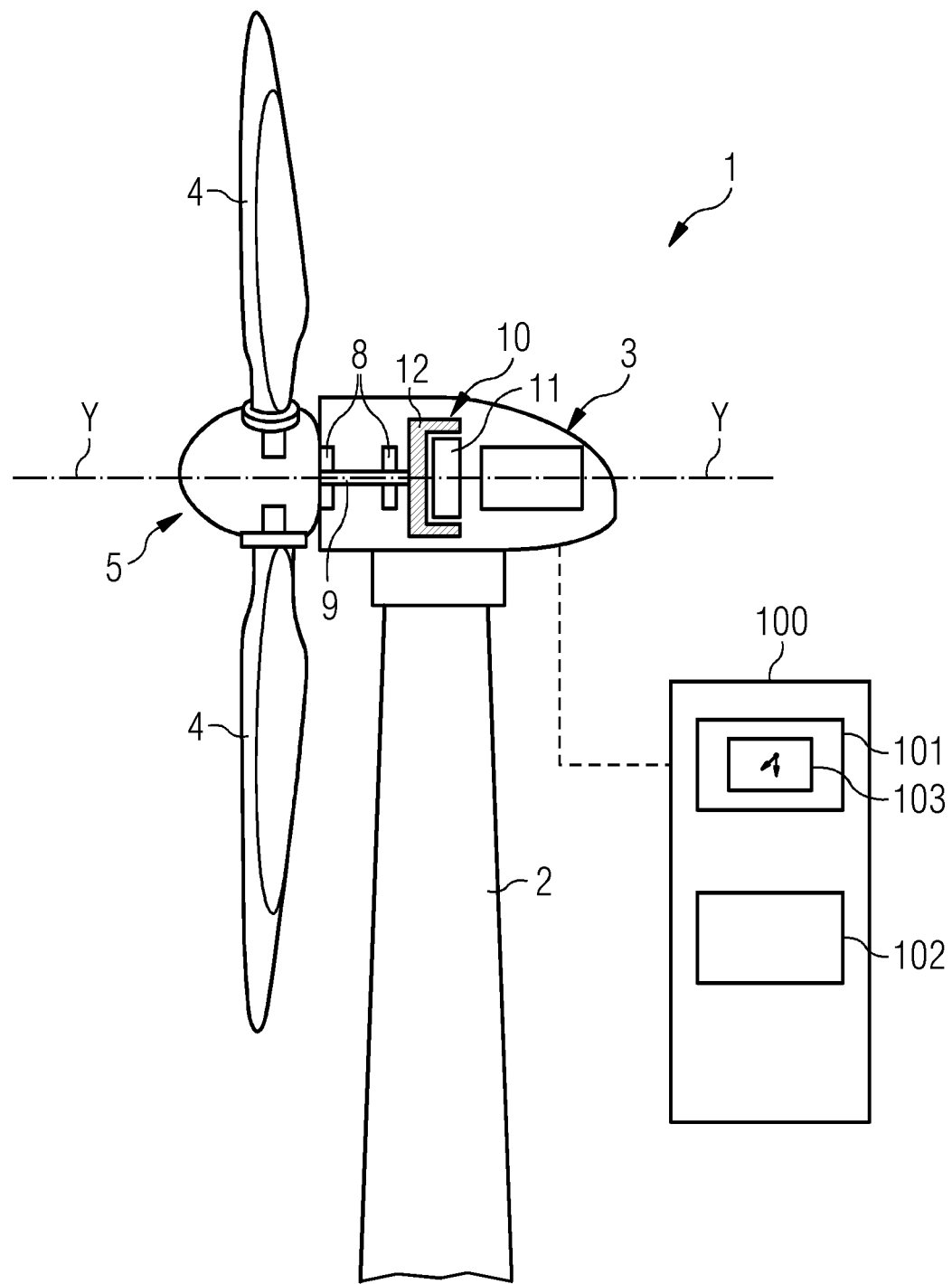
FIG. 1 shows a schematic section of a wind turbine including a controller according to embodiments of the present invention.

FIG. 1 shows a wind turbine 1 according to embodiments of the invention. The wind turbine 1 comprises a tower 2, which is mounted on a non-depicted foundation. A nacelle 3 is arranged on top of the tower 2. In between the tower 2 and the nacelle 3 a yaw angle adjustment device (not shown) is provided, which is capable of rotating the nacelle around a vertical yaw axis. The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y. The blades 4 extend radially with respect to the rotational axis Y. Each rotor blade 4 is mounted pivotable to wind rotor 5, in order to be pitched about respective pitch axes X. This improves the control of the wind turbine 1 and in particular of the rotor blades 4 by the possibility of modifying the direction at which the wind is hitting the rotor blades 4. The wind turbine 1 comprises an electrical generator 10. The wind rotor 5 is rotationally coupled with the electrical generator 10 by a rotatable main shaft 9 and a gearbox (not shown in FIG. 1). According to other possible embodiments of the present invention (not represented in the attached figures), the wind rotor 5 is rotationally coupled directly with the electric generator 10 (direct-drive generator configuration). A schematically depicted bearing assembly 8 is provided in order to hold in place the main shaft 9. The rotatable main shaft 9 extends along the rotational axis Y. The electrical generator 10 includes a stator 11 and a rotor 12. The rotor 12 is radially external to the stator 11 and is rotatable with respect to the stator 11 about the rotational axis Y. According to other embodiments of the present invention (not shown) the rotor is radially internal to the stator 11.

The wind turbine 1 includes the controller 100 (schematically represented in FIG. 1). The controller 100 includes a power controller unit 101 and a pitch controller unit 102. The power controller unit 101 is a controller which outputs a power reference value for the electrical generator 10 (i.e., the power value which is to be outputted by the electrical generator 10). The pitch controller unit 102 outputs a pitch reference value (i.e., the value of the pitch angle around the axis X for the blades 4 of the wind turbine 1). The power controller unit 101 operates the electric generator 10 according to a power reference value 212, 214. A speed reference value 211, 213 is defined by the power reference value 212, 214 along an operating trajectory 203, 204, 205 in a power vs speed graph 200, as better clarified in the following with reference to FIG. 2. The operating trajectory 203, 204, 205 may be linear or curved (non-linear). For linear operating trajectories 204, 205 the power controller unit 101 includes a slider command 103 for selecting the angular position of the linear operating trajectory 204, 205 in the power vs speed graph 200. The turbine power controller unit 101 operates the electric generator 10 along the operating trajectory until speed reference value 211, 213 is reached. Once the speed reference value 211, 213 is reached a controller, e.g., PI-controller, is used to adjust the power to keep the rotational speed at the speed reference value 211, 213. Once the power reference value 212, 214 at the speed reference value 211, 213 is reached the pitch controller 102 is used to adjust the blade position to keep the rotational speed at the speed reference 211, 213. The pitch controller 102 can control the blade position when the power is below the power reference value 212, 214 to be reached.

Figure 2:
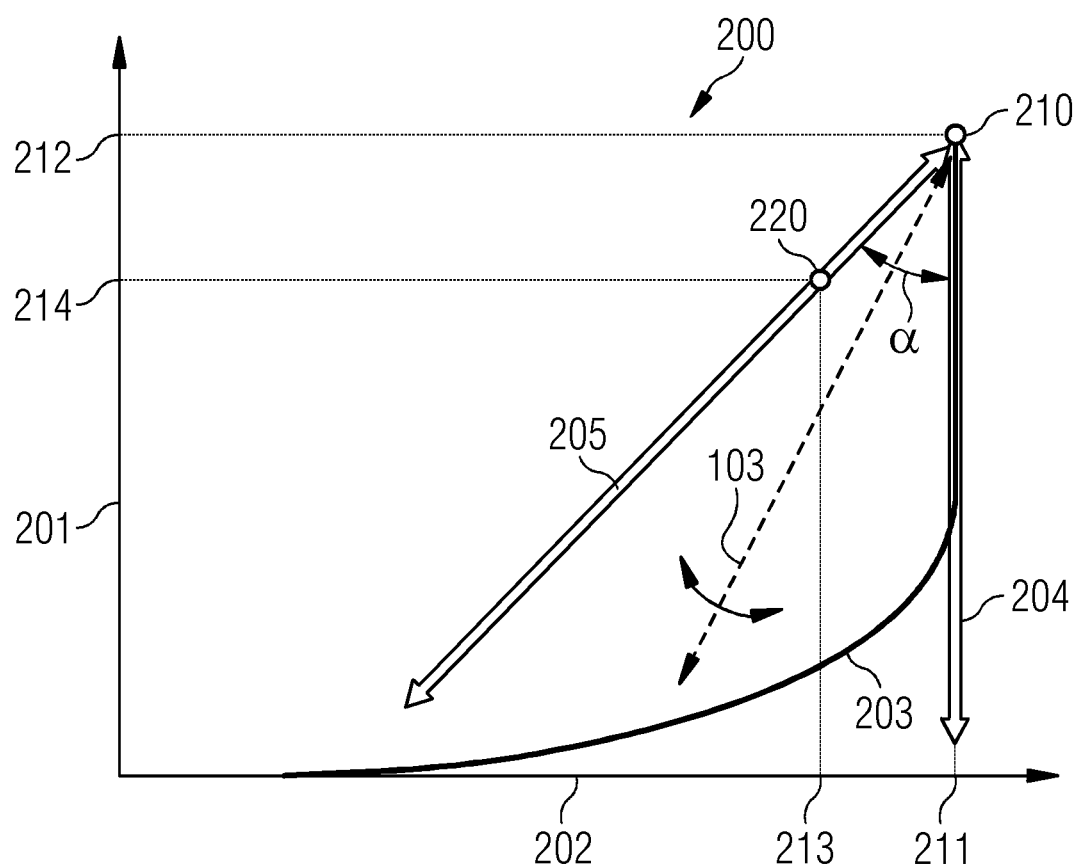
FIG. 2 shows power vs. rotational speed operating trajectories of a control system according to embodiments of the present invention.

FIG. 2 shows a power vs. rotational speed graph 200 including a plurality of operating trajectories 203, 204, 205 implemented by the controller unit 101. In the graph 200 the ordinate 201 represents the power, while the abscissa 202 represents the rotational speed of the generator. The curved operating trajectory 203 is the nominal/optimal operating trajectory, where the power is a function of the speed until it reaches nominal speed 211. From there the power is controlled at fixed speed, for example using a PI controller for reaching the point 210 of nominal power 212. If power reaches a saturation value, the speed can be controlled by the pitch controller 102. If the speed reference is kept constant to the nominal speed 211, the controller unit 101 operates according to the vertical operating trajectory 204, which includes the point 210 of nominal power 212. The vertical operating trajectory 204 provides the fastest ramp-up time, as a high level of kinetic energy is reserved in the rotor 12 of the electric generator 10, i.e., it is not necessary to speed up the rotor 12 before the highest possible power can be reached. If the generator 10 is operated along the vertical operating trajectory 204 a first power ramp-up rate (c1*P) per second is generated, wherein P is the nominal power 212 and c1 a constant. The first power ramp-up rate is applied to the electric generator 10 for reaching a nominal power 212 of the electric generator at the nominal generator speed 211 along the vertical operating trajectory 204). The value of c1 may be a percentage comprised between 20% and 40%.

According to one embodiment of the present invention, c1 is particularly chosen as 25%.

If a reduced speed 213 is used as reference speed, the controller unit 101 operates according to the inclined operating trajectory 205, which includes a plurality of points 220, each corresponding to a reduced power 214 value (i.e., a power value, which is lower than the nominal power 212) and a reduced rotational speed 213 (i.e., a rotational speed value, which is lower than the nominal speed 211). The inclined operating trajectory 205 includes the point 210 of nominal power 212.

According to embodiments of the present invention, the inclined operating trajectory 205 may be determined in order to provide a constant torque measured on the electric generator 10. According to other embodiments of the present invention, the inclined operating trajectory 205 may be chosen in order to provide a maximum power of the electric generator 10 at each speed reference value 211, 213. According to yet other embodiments of the present invention, the inclined operating trajectory 205 may be chosen in order to avoid operating at rotational speeds corresponding to structure Eigenvalues of the wind turbine 1. Along the inclined operating trajectory 205 the power ramp-up time is longer than along the vertical operating trajectory 204. If the generator 10 is operated along the inclined operating trajectory 205 the rotational speed is increased as the power is increased, this results in a second power ramp-up rate (c2*P) per second is generated, wherein c2 is a constant lower than c1. The value of c2 may be a percentage comprised between 1% and 10%. According to one embodiment of the present invention, c2 is particularly chosen as 2%. The lower rotor speed provides a reduction in loads as well. In the power vs. rotational speed graph 200 an angle α is provided between the vertical operating trajectory 204 and the inclined operating trajectory 205. The value of the angle α is selectable through the slider command 103 (schematically represented by a dashed swinging line in FIG. 2) between 0° and 90°, 0° corresponding to the vertical operating trajectory 204 and 90° corresponding to a horizontal line in the power vs. rotational speed graph 200 including the point 210 of nominal power 212.

According to embodiments of the present invention, the angle α may be changed during the power ramp-up. For example, the rotational speed may be ramped up first, i.e., the operational point is moved towards right in the power vs. rotational speed graph 200 or, equivalently, the value of the angle α is reduced. The power is ramped up with some seconds delay. This mode uses the fact that the aerodynamic of the blades 4 is more efficient at higher rotor speeds. According to such embodiments, the power may be kept constant until a speed reference is reached, and after that the power may be ramped to the power reference value.

Figure 3:
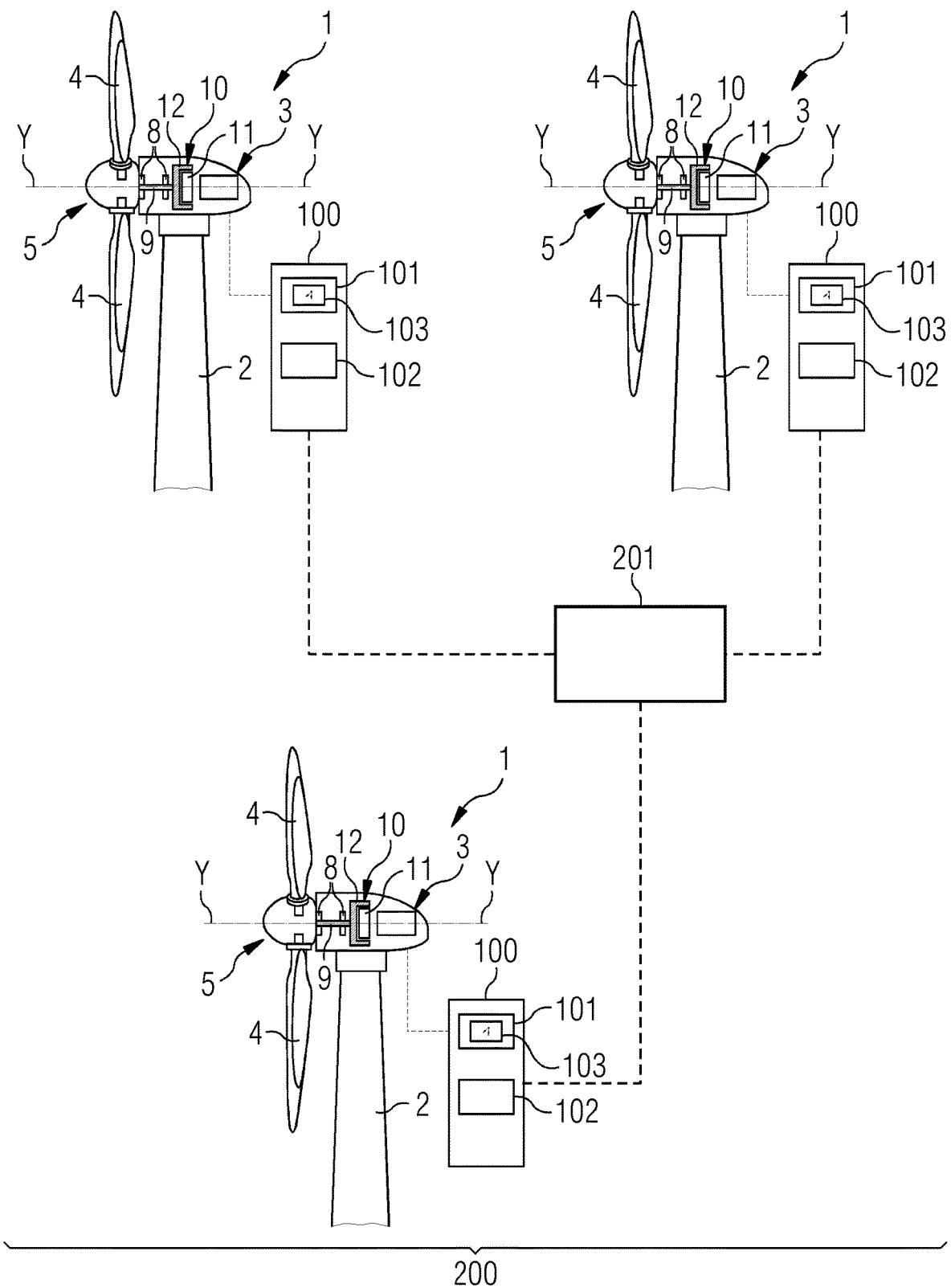
FIG. 3 shows a schematic section of a wind turbine park including a controller according to embodiments of the present invention.

FIG. 3 shows a wind park 200 including a plurality of wind turbine 1. The wind park 200 includes a park level controller 201 connected to the controller 100 of each turbine 1 and adjusting the operational trajectory in each turbine 1 of the wind park 200, based on a park level operation mode. Alternatively, the park level controller 201 may be directly connected to each turbine 1. The operation mode can be due, for example, to frequency deviations or curtailment due to trading decisions.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A controller for a wind turbine, the controller comprising a power controller unit for controlling a power output of an electric generator comprised in the wind turbine, the power controller unit operating the electric generator according to a speed reference value and a power reference value, the speed reference value and the power reference value being chosen along a linear operating trajectory in a power vs speed graph, the linear operating trajectory including a point corresponding to the nominal power and the nominal generator speed, wherein the power controller unit includes a slider command for selecting an angular position of the linear operating trajectory in the power vs speed graph,
wherein the linear operating trajectory is movable in the power vs speed graph between a vertical operating trajectory and an inclined operating trajectory, an angle being provided between the vertical operating trajectory and the inclined operating trajectory, the value of the angle being selectable through the slider command of the power controller unit between 0° and 90°.

2. The controller according to claim 1, wherein the inclined operating trajectory is chosen in order to provide a constant torque measured on the electric generator.

3. The controller according to claim 1, wherein the inclined operating trajectory is chosen in order to avoid operating at rotational speeds corresponding to structure Eigenvalues of the wind turbine.

4. The controller according to claim 1, wherein the inclined operating trajectory is chosen in order to provide a maximum power of the electric generator at each speed reference value.

5. The controller according to claim 1, wherein the angular position of the operating trajectory is changed before the power reference value and/or the speed reference value is reached on the power vs speed graph.

6. A wind turbine including an electric generator and the controller according to claim 1.

7. A wind park including a plurality of wind turbines and the controller according to claim 1.

8. The wind park according to claim 7, wherein the wind park includes a park level controller adjusting the operational trajectory in each turbine based on a park level operation mode.

9. A method of controlling operation in a wind turbine, the method comprising:
operating an electric generator of the wind turbine according to a speed reference value and a power reference value, the speed reference value and the power reference value being chosen along a linear operating trajectory in a power vs speed graph, the linear operating trajectory including a point corresponding to the nominal power and the nominal generator speed, and
selecting an angular position of the linear operating trajectory in the power vs speed graph,
wherein the linear operating trajectory is movable in the power vs speed graph between a vertical operating trajectory and an inclined operating trajectory, an angle being provided between the vertical operating trajectory and the inclined operating trajectory, the method including selecting a value of the angle between 0° and 90°.

10. The method according to claim 9, wherein the inclined operating trajectory is chosen in order to provide a constant torque measured on the electric generator.

11. The method according to claim 9, wherein the inclined operating trajectory is chosen in order to avoid operating at rotational speeds corresponding to structure Eigenvalues of the wind turbine.

12. The method according to claim 9, wherein the inclined operating trajectory is chosen in order to provide a maximum power of the electric generator at each speed reference value.

\* \* \* \* \*